United States Patent [19]

Chikada et al.

[11] Patent Number: 5,365,414
[45] Date of Patent: Nov. 15, 1994

[54] DEVICE FOR CONFIRMING OPTICAL-AXIS ADJUSTMENT OF AUTOMOTIVE HEADLAMP

[75] Inventors: Akira Chikada, Isehara; Shigeteru Ohgiri, Hadano, both of Japan

[73] Assignee: Ichikoh Industries, Ltd., Tokyo, Japan

[21] Appl. No.: 970,406

[22] Filed: Oct. 28, 1992

[30] Foreign Application Priority Data

Oct. 28, 1991 [JP] Japan .............................. 3-088280[U]
Nov. 25, 1991 [JP] Japan .............................. 3-096477[U]
May 8, 1992 [JP] Japan .............................. 4-030063[U]

[51] Int. Cl.$^5$ .............................................. B60Q 1/00
[52] U.S. Cl. .......................................... 362/61; 362/66; 362/269; 33/335; 33/379
[58] Field of Search ................ 362/61, 66, 101, 226, 362/269; 33/288, 370, 376, 335, 379

[56] References Cited

U.S. PATENT DOCUMENTS

| | | | |
|---|---|---|---|
| 4,922,387 | 5/1990 | Ryder et al. | 362/61 |
| 5,055,980 | 10/1991 | Mochizuki | 362/61 |
| 5,065,293 | 11/1991 | Mochizuki | 362/61 |
| 5,107,407 | 4/1992 | Collot et al. | 362/61 |
| 5,111,369 | 5/1992 | Shirai et al. | 362/61 |
| 5,151,849 | 9/1992 | Nagengast et al. | 362/61 |

*Primary Examiner*—Larry Jones
*Attorney, Agent, or Firm*—Foley & Lardner

[57] ABSTRACT

In an optical-axis adjustment confirming device for use with an automotive headlamp, a level is mounted on a to-be-adjusted member which is covered with a transparent cap to protect the level against external shock or the like. An initial setting device has a resilient retainer which can be provided integrally on a mount member or casing, so as to reduce the number of parts required. The resilient retainer provided for the level can absorb the distortion caused due to a difference in thermal expansion ratio between the casing and bubble tube and may include pawls and cuts formed at both sides of the pawls to permit the pawls to resiliently open and close. Couplings may be provided to prevent an edge of the casing from being deformed, and thus the bubble tube can be rigidly fixed in the casing. Since the body and cover are formed integrally, the level can be made of a reduced number of parts. A level reference provided on the casing permits an accurate confirmation of the optical-axis adjustment.

20 Claims, 15 Drawing Sheets

DEVICE FOR CONFIRMING OPTICAL-AXIS ADJUSTMENT OF AUTOMOTIVE HEADLAMP

BACKGROUND OF THE INVENTION a) Field of the Invention

The present invention relates to a device for confirming the adjustment in the up/down or vertical direction of the optical axis of an automotive headlamp. This optical-axis adjustment confirming device uses a level comprising a casing which houses and holds a bubble tube. The position of the bubble in the bubble tube of the level is visually checked to see whether or not the optical axis of the automotive headlamp has been correctly adjusted in the vertical direction.

More particularly, the present invention provides a device for confirming the optical-axis adjustment of an automotive headlamp in which the level can be protected against any external shock (e.g., foreign matter such as a stone or water), the level can be initially set with a reduced number of parts and also made of a reduced number of parts, the bubble tube can be securely held in the casing, and the optical-axis adjustment can be accurately confirmed.

b) Statement of the Prior Art

If directed excessively upward, the light beam projected from the automotive headlamp will dazzle the driver of a car approaching in the opposite lane, possibly causing a dangerous situation. On the contrary, if directed excessively downward, it will not provide a correct illumination of the road in front of the car. Therefore, the automotive headlamp must have a device which is fixed on the car body to slightly adjust the optical-axis in the vertical direction.

A typical one of the automotive headlamps of this type is known from the disclosure in the U.S. Pat. No. 5,055,980, in which a to-be-adjusted member is pivotably mounted on a mount body by means of a pivot bearing, a lamp bulb is fixed to the to-be-adjusted member, and a device for adjusting the optical axis in the vertical direction is fixed between the to-be-adjusted member and mount body. The vertical optical-axis adjusting device is operated to pivot the to-be-adjusted member vertically with respect to the mount body for adjustment of the optical axis in the vertical direction.

The above-mentioned automotive headlamp is provided with a right/left or horizontal optical-axis adjusting device in addition to the vertical optical-axis adjusting device. The horizontal optical-axis adjusting device can be operated to pivot the to-be-adjusted member horizontally with respect to the mount body for adjustment of the optical axis in the horizontal direction.

Also, the above-mentioned automotive headlamps include two types. In one of these two types, the reflector is tiltable, and the reflector as the to-be-adjusted member is pivotably mounted on a lamp housing as the mount body. In the other type, the lamp unit is tiltable, and the lamp unit as the to-be-adjusted member is pivotably mounted on the car body as the mount body.

The direction of the optical axis must be adjusted with a high accuracy and can be adjusted accurately only by an expert engineer with special equipment. Before shipment from the automobile manufacturing works or when the headlamps are equipped in a car at an adjustment specialty shop, the optical axes of the head lamps are adjusted by the expert engineer with the special equipment. If the optical axis of the headlamp of a car has been deviated from its due direction for any reason after being adjusted at such works or shop, it must be readjusted.

However, some reference is available for such readjustment. Namely, since the optical axis of the headlamp has already been adjusted accurately, it can be readjusted without any special equipment and expert engineer by reproducing its initial state of adjustment. Various kinds optical-axis adjustment confirming devices (more specifically, devices for confirming whether the initial state of optical-axis adjustment is reproduced or not) based on such concept have been proposed.

A typical one of such devices is disclosed in the above-mentioned U.S. Pat. No. 5,055,980.

This conventional optical-axis adjustment confirming device comprises a to-be-adjusted member, a horizontally extending portion formed on the member, a casing fixed indirectly to the horizontally extending portion by means of a leaf spring or the like or directly to it with a screw or the like, a bubble tube, a cover supporting the tube at the rear side thereof and of which one end is engaged on one end of the casing, and a spring and adjusting screw used to fix the other end of the cover vertically tiltably to the other end of the casing.

After completion of the optical-axis adjustment by the expert engineer using the special equipment, the adjusting screw is adjusted for the bubble in the bubble tube to come to the reference line (zero point on scale) to initially set the optical-axis adjustment confirming device. If the optical axis of the headlamp is considered to have been directed in a wrong direction due to a remodeling of the car body or loading to the car, the car is stopped on a horizontal floor or ground surface and the position of the bubble in the bubble tube is visually checked. If the bubble is found not coincide with the reference line, it means that the vertical direction of the optical axis has deviated from a correct one. In this case, the to-be-adjusted member is tilted vertically so that the bubble coincident with the reference line by operating the vertical optical-axis adjustment confirming device while watching the movement of the bubble in the bubble tube. By this operation, the vertical direction of the optical axis will recover its accurately adjusted initial state.

However, this optical-axis adjustment confirming device is a level consisting of a casing bubble tube and which are provided as just project outwardly from the automotive headlamp, and therefore such devices have no countermeasure against an external shock or the like.

SUMMARY OF THE INVENTION

The present invention has an object to provide an optical-axis adjustment confirming device in an automotive headlamp, which can protect the level against an external shock or the like.

This object is accomplished by mounting the level on a to-be-adjusted member, projecting it out of the bulb space and covering it with a transparent cap. As a result, the transparent cap provided around the level projecting out of the bulb space serves to protect the level against an external shock or the like.

Another object of the present invention is to provide an optical-axis adjustment confirming device which serves to accurately confirm the optical-axis adjustment.

This object is accomplished by mounting the level on a movable reflector as the to-be-adjusted member, projecting it out of the bulb space through an opening formed in the lamp housing as the mount body, covering the level and opening with a transparent cap, and providing on the opening of the lamp housing or of the transparent cap a heat insulation member to isolate the level from a thermal convention of air inside the bulb space. As the result, the heat insulation member provided on the opening can isolate the level outside the bulb space from the thermal convection of air inside the lamp housing so that the level will be least influenced by the heat and the optical axis adjustment can be confirmed with a correspondingly high accuracy.

Still another object of the present invention is to provide an optical-axis adjustment confirming device in which the level can be initially set with a reduced number of parts.

This object is accomplished by fixing the mount member to the to-be-adjusted member, mounting the level pivotably on the mount member, providing between the mount member and level a resilient member which forces the level always in one direction toward the mount member, and mounting on the mount member by means of the level an initial- setting keeping member which initially sets the level and maintains the posture of the level after being initially set against the resilience of the resilient member. With this arrangement, the resilient member can be integrally formed on the mount member or casing, and thus the optical-axis adjustment confirming device can be made of a correspondingly fewer number of parts.

Yet another object of the present invention is to provide an optical-axis adjustment confirming device in which the bubble tube can be held securely in the casing.

This object is accomplished by providing on the casing a resilient retainer which is resiliently engaged on one end of the bubble tube of which the other end is pressed to the inner face of the casing and which resiliently holds the bubble tube in the axial direction thereof. Thus, the resilient retainer can absorb the distortion of the casing caused due to the difference in thermal expansion ratio between the casing and bubble tube, thereby allowing the bubble tube to be held securely in the casing.

Another object of the present invention is to provide an optical-axis adjustment confirming device in which the bubble tube can be securely held in the casing as in the above-mentioned invention.

This object is accomplished by forming a convex portion in the opening of the casing, forming cuts at both sides of the convex portion and providing flexible couplings in the cuts. As a result, the convex portion prevents the bubble tube in the casing from going out, the cuts formed at both sides of the convex portion permit a flexible flapping of the convex portion when the bubble tube is introduced into the casing, and the flexible couplings provided in the cuts prevent the casing from deflecting at the edge thereof when the level is initially set by pivoting, thereby allowing the bubble tube to be held securely in the casing.

A further object of the present invention is to provide an optical-axis adjustment confirming device in which the level is made of a reduced number of parts.

This object is accomplished by coupling one end of a cover having a transparent portion through which the bubble tube is viewed to one end of the casing body which houses and holds the bubble tube in such a manner that the cover can be opened and closed around an integral coupling of a hinge-like structure. With this arrangement, the casing body and cover can be formed integrally around the integral coupling of the hinge-like structure.

A yet further object of the present invention is to provide an optical-axis adjustment confirming device by which the optical-axis adjustment can be confirmed accurately.

This object is accomplished by providing at the edge of the transparent portion of the casing a horizontal reference portion which will be the reference of whether the level is horizontal or not. With this arrangement, the horizontal reference portion of the casing outside the level is easy to view even when the scale is provided on the bubble tube inside the casing, thus ensuring that the optical-axis adjustment can be confirmed accurately.

BRIEF DESCRIPTION OF THE DRAWINGS

FIGS. 1 through 23 show an embodiment of the optical-axis adjustment confirming device according to the present invention, of which FIG. 1 is a front view of the automotive headlamp having a movable reflector and provided with the optical-axis adjustment confirming device according to the present invention;

FIG. 2 is a rear view of the device;

FIG. 3 is an enlarged-in-scale rear view of the essential part of the device;

FIG. 4 is a sectional view taken along the line IV—IV in FIG. 3;

FIG. 5 is an enlarged-in-scale sectional view of the essential part of the device;

FIG. 6 is a sectional view taken along the line VI—VI in FIG. 5;

FIG. 7 is a plan view of the casing in which the bubble tube is housed and of which the cover is opened;

FIG. 8 is a partially perspective view of the pawl of the casing and the coupling;

FIG. 9 is a partially perspective view of the variants of the pawl of the casing and the coupling;

FIG. 10 is a partially perspective view showing the resilient retention of the bubble tube by the resilient retainer of the casing;

FIG. 11 is a plan view of the case in which the bubble tube is housed and of in which the cover is closed;

FIG. 12 is a sectional view taken along the line XII—XII in FIG. 11;

FIG. 13 is a sectional view of in the case shown in FIG. 12 of which the cover is opened;

FIG. 14 is a sectional view taken along the line XIV—XIV in FIG. 11;

FIG. 15 is a sectional view taken along the line XV—XV in FIG. 11;

FIG. 16 is a side elevation of the casing in which the bubble tube is housed and in which the cover is closed;

FIG. 17 is a side elevation in the case shown in FIG. 16 of which the cover is opened;

FIG. 18 is a front view of the casing in which the bubble is housed and in which the cover is closed;

FIG. 19 is a rear view of the casing in which the bubble tube is housed and in which the case is closed;

FIG. 20 is an explanatory drawing of a varient in which cuts are formed through both sides of the pawl on the edge of the opening in the casing;

FIG. 21 is a plan view of the mount member;

FIG. 22 is a sectional view taken along the line XXII—XXII in FIG. 21;

FIG. 23 is a sectional view taken along the line XXIII—XXIII in FIG. 21;

Figure 1:
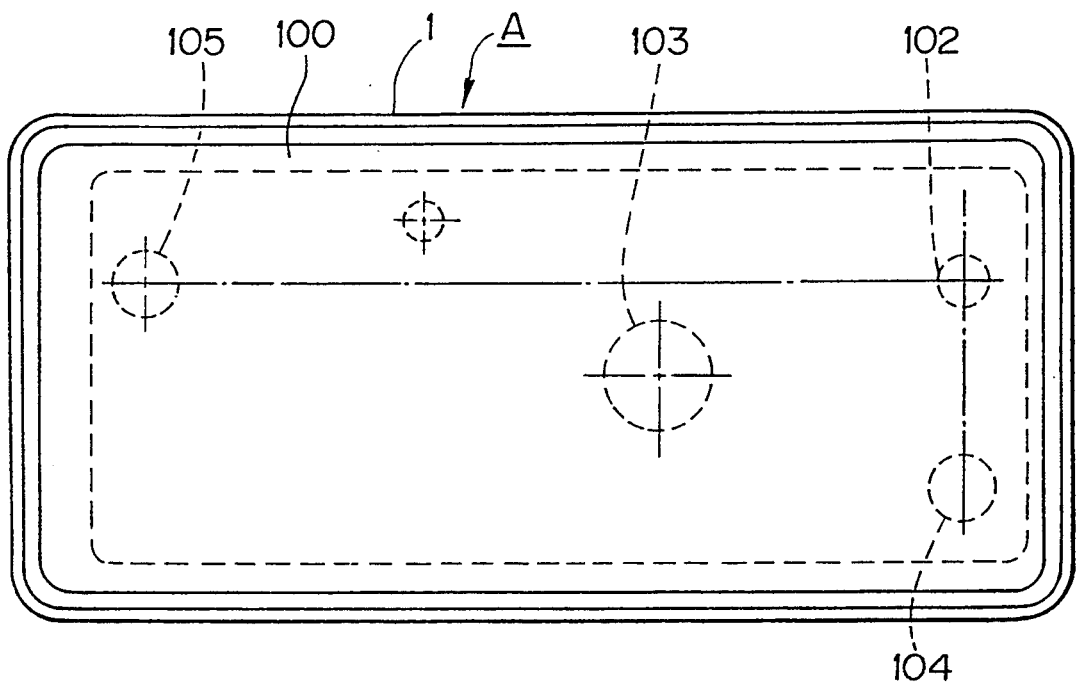

Note that these Figures are prepared as simplified by omitting the elements having nothing to do directly with the optical-axis adjustment confirming device according to the present invention within a range on which the omission will not have any adverse affect on the understanding of the optical-axis adjustment confirming device.

DETAILED DESCRIPTION OF THE PREFERRED EMBODIMENTS

FIGS. 1 through 23 show an embodiment of the optical-axis adjustment confirming device according to the present invention, which is provided on an automotive headlamp having a movable reflector.

In the Figures, the letter A denotes an automotive headlamp provided with the optical-axis adjustment confirming device according to the present invention. The device A has a structure described below. As shown in FIGS. 1 through 4, the headlamp comprises a lamp housing I as the mount body having a front lens 100 disposed at the front opening thereof. The front lens 100 and lamp housing I define together a bulb space 101 in which a movable reflector 2 as the to-be-adjusted member is mounted to the lamp housing I so as to be pivotable by a pivot bearing 102. The movable reflector 2 has formed on the front side thereof a reflecting surface to reflect the light from a lamp bulb 103 which will be described later toward the front lens 100. The lamp bulb 103 is disposed at the reflecting surface of the movable reflector 2 and inside the bulb space 101. A vertical optical-axis adjuster 104 and horizontal optical-axis adjuster 105 are provided on the lamp housing I and movable reflector 2, respectively. The movable reflector 2 (including the lamp bulb 103) is pivoted vertically or horizontally by operating the vertical optical-axis adjuster 104 or horizontal optical-axis adjuster 105 to adjust the direction of the optical axis.

The above-mentioned vertical optical-axis adjuster 104, horizontal optical-axis adjuster 105, pivot bearing 102, etc. per se are well known as disclosed in, for example, in the U.S. Pat. No. 5,055,980 and so their detailed description and illustration are omitted herein.

Figure 2:
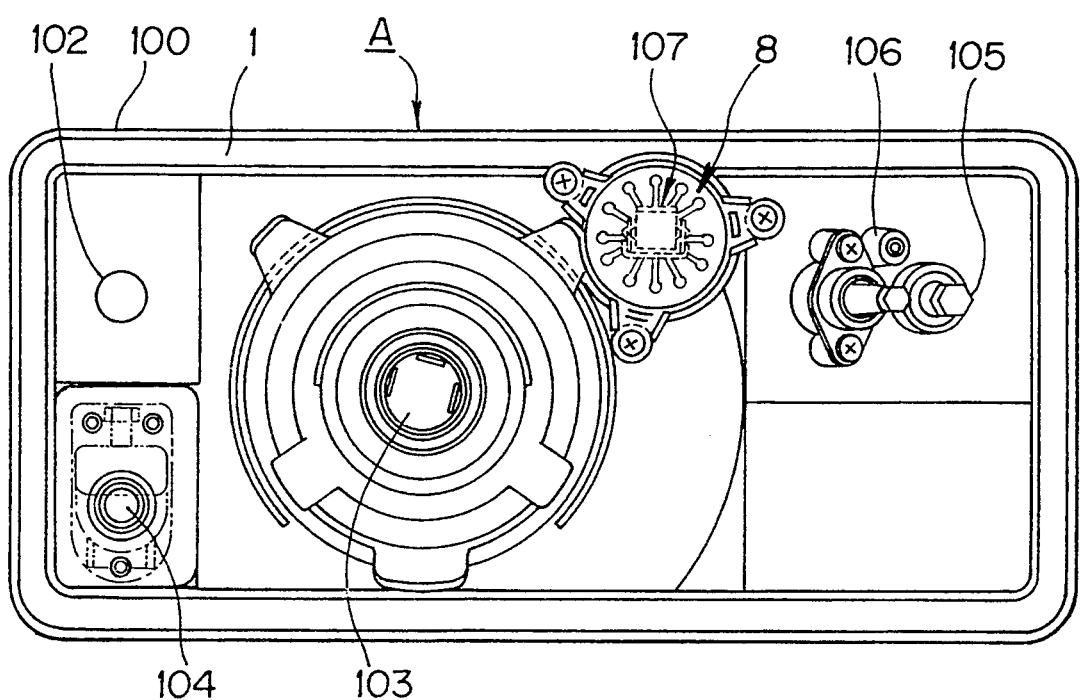
Figure 3:
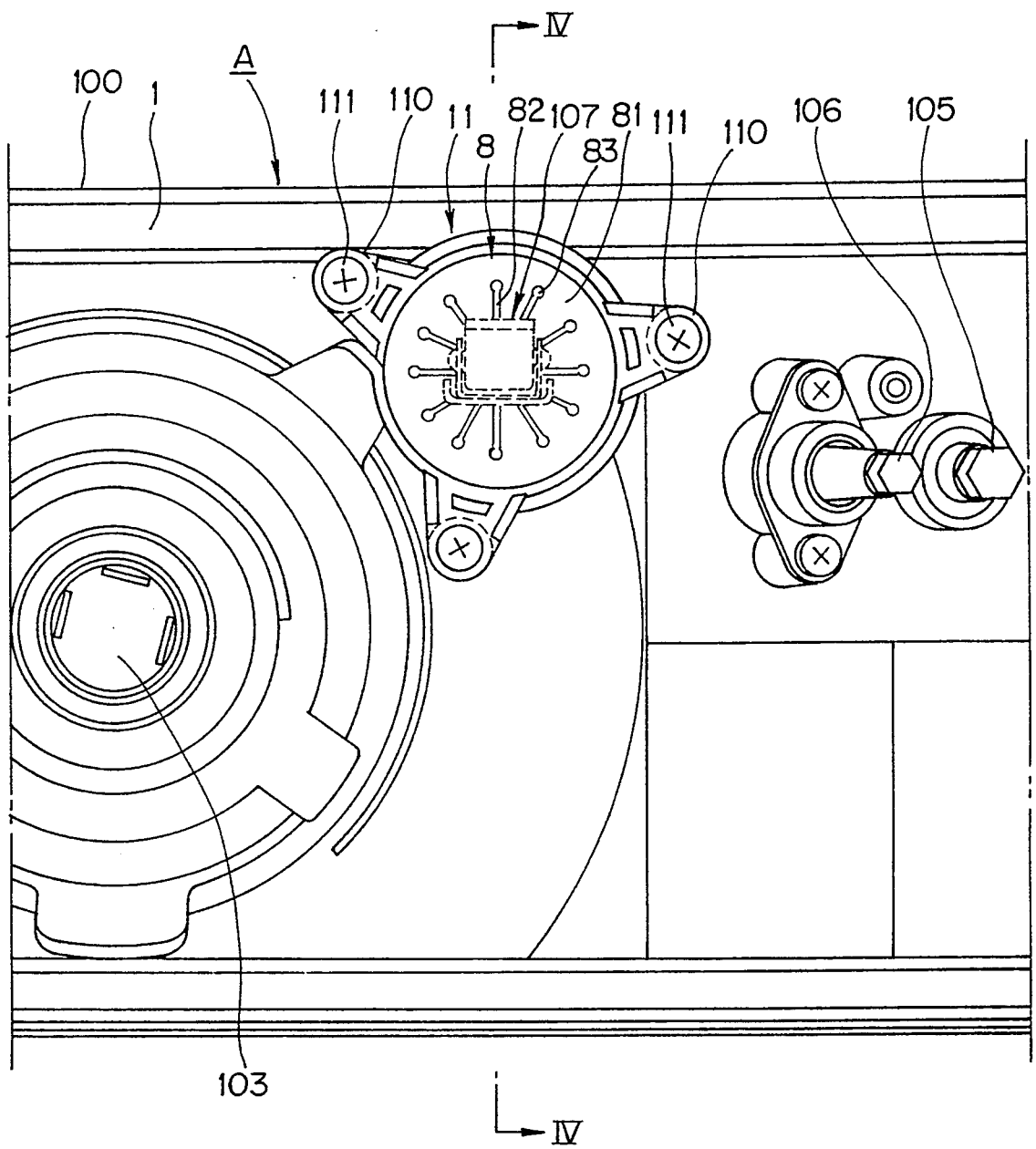

In FIGS. 2 and 3, the reference numeral 106 denotes the horizontal optical-axis adjustment confirming device and 107 denotes the vertical optical-axis adjustment confirming device according to the present invention.

Figure 4:
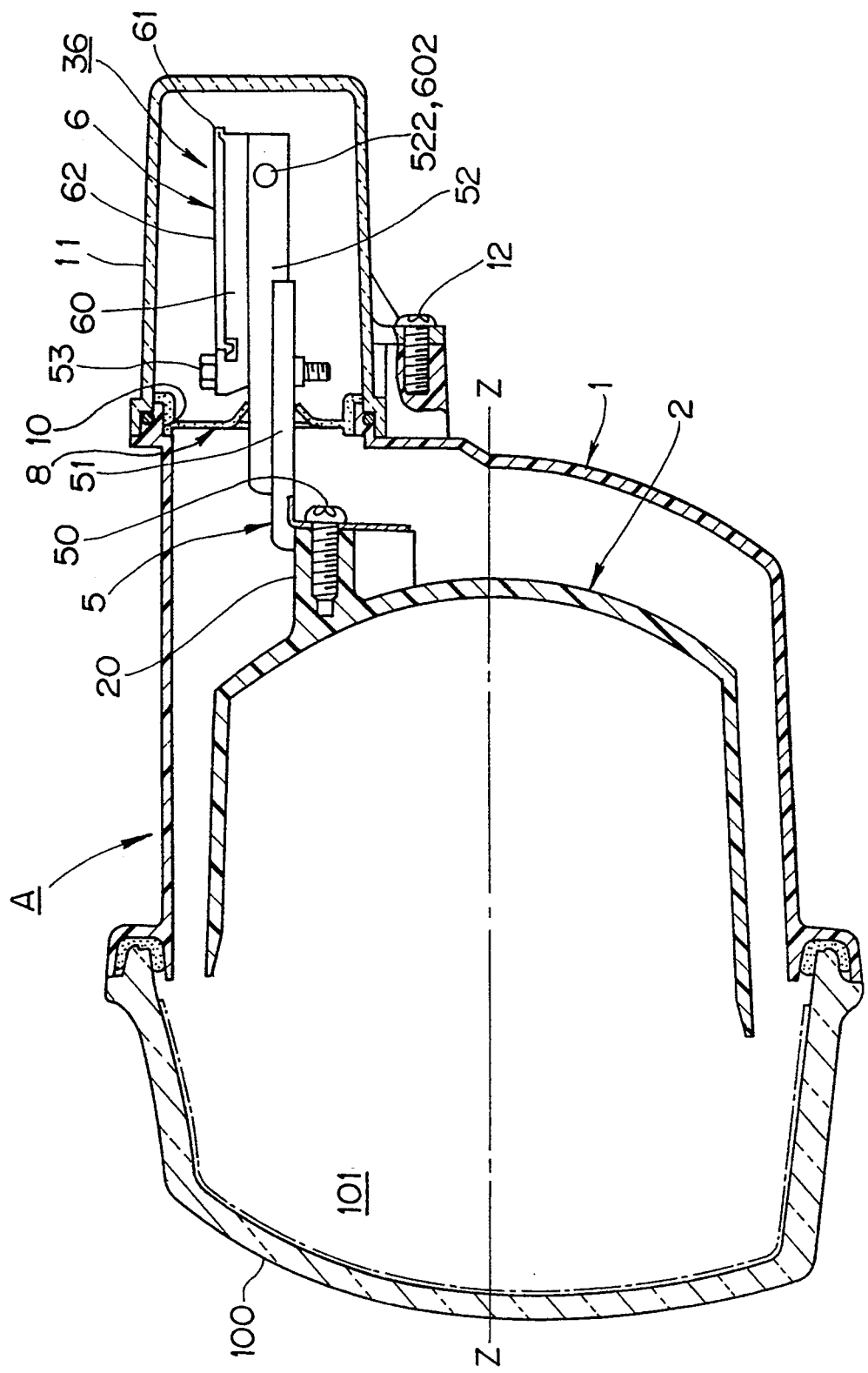
Figure 5:
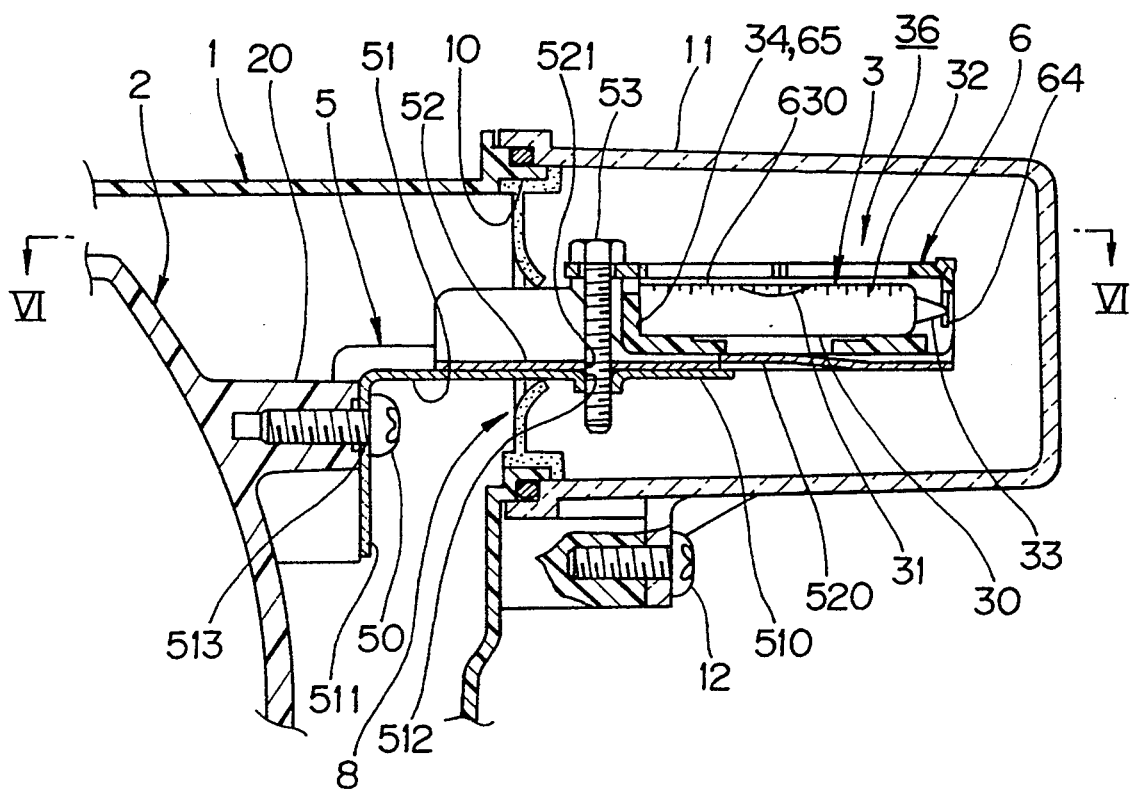
Figure 6:
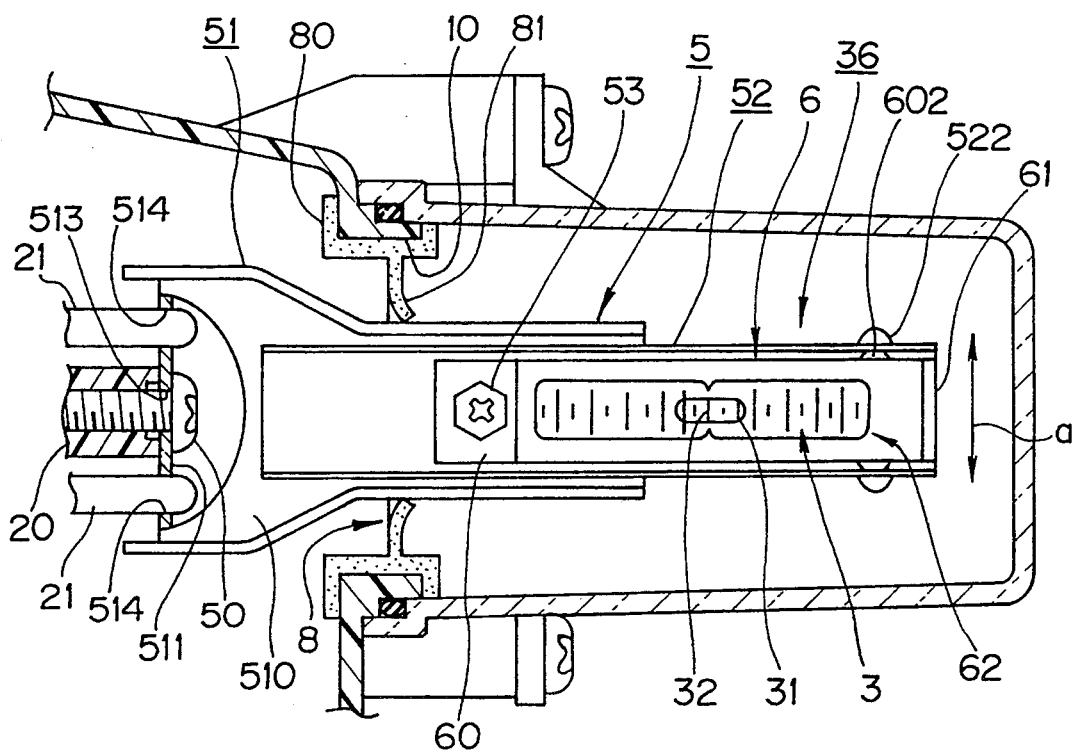

As seen in FIGS. 4 through 6, an opening 10 is formed at the rear portion of the lamp housing I in the location where the optical-axis adjustment confirming device according to the present invention is to be mounted. A step is formed on the circumferential edge of the opening 10 of the lamp housing 1. A fixing boss 20 is provided as integrally projected at the rear portion of the movable reflector 2 in that location where the optical-axis adjustment confirming device according to the present invention is to be mounted and two positioning convex portions 21 are provided as integrally projected at both sides of the fixing boss 20. It should be noted that the positioning convex portions 21 are somewhat longer than the fixing boss 20.

Figure 21:
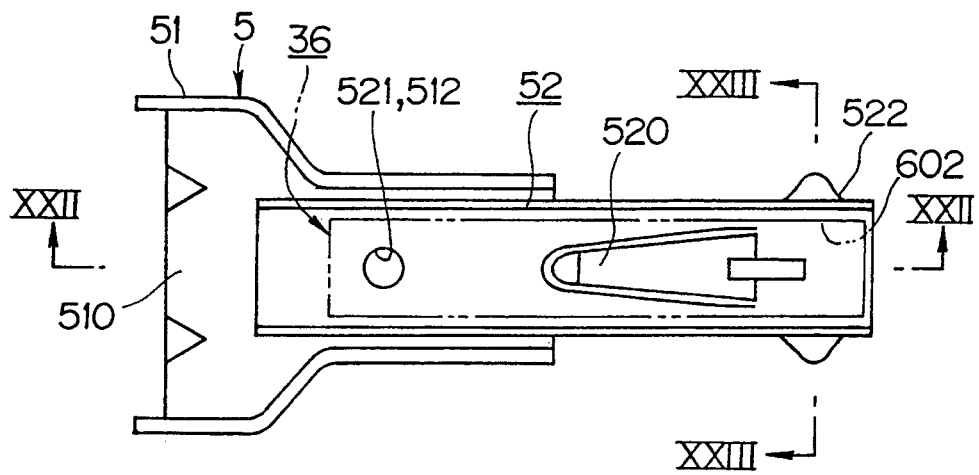
Figure 22:
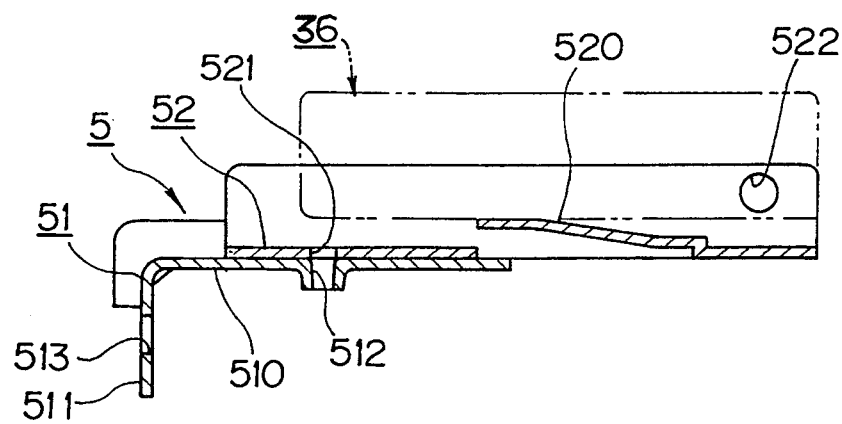
Figure 23:
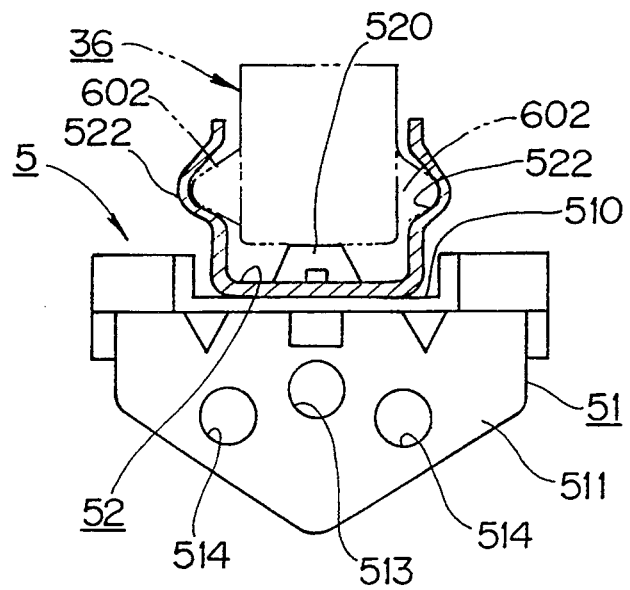

In the Figures, the reference numeral 5 denotes a member to mount to the movable reflector 2 a level 36 which will be described later. As shown in FIGS. 21 through 23, the mounting member 5 consists of a first mount plate 51 made of, for example, a thin steel sheet and a second mount plate 52 made of, for example, a same thin steel sheet, which are fixed to each other by welding or the like technique.

The first mount plate 51 has a narrow portion on one-end side thereof extending nearly to the middle point thereof and a wide portion at the other-end side. The wide portion of the first mount plate 51 is bent at a right angle to form a horizontal portion 510 and vertical portion 511. Further, both lateral edges extending from one end of the horizontal portion 510 of the first mount plate to the mid point of the vertical portion 511 is bent at a right angle. A screw hole 512 is formed nearly in the center of the horizontal portion 510. A through-hole 513 for a fixing screw 50 is formed in the center of the vertical portion 511 and two through-holes 514 for two positioning convex portions 21, respectively, are formed on both sides, respectively, of the through-hole 513.

The second mount plate 52 has the horizontal bottom thereof bent at a fight angle at both sides thereof. The second mount plate 52 has the horizontal bottom thereof lanced from the center toward the end thereof to form a tongue-like leaf spring 520 as the resilient member. The end of this spring 520 is bent horizontally to form a horizontal abutment which abuts the bottom of the casing 6. The horizontal abutment will be described later. The spring 520, that is, the resilient member, is formed integrally with the mount member 5, but it may be provided integrally with the casing 6 of the level 36 which will be described in detail later or integrally with both the mount member 5 and casing 6.

There is formed in the other end of the horizontal bottom of the second mount plate 52 a through-hole 521 for a screw 53 used for maintaining the initial setting and which will be described in detail later. The through-hole 521 is so formed as to communicate with the screw hole 512 in the first mount plate 51. A pair of engagement conical concavities 522 is formed each in one end of both vertical lateral sides of the second mount plate 52. It should be noted that the engagement concavities 522 may have forms other than the conical concavity or may be formed as pieces separate from the mount plate 52. In the latter case, they may be attached to the mount plate by bonding or the like.

As seen from FIG. 6, two through-holes 514 for positioning the mount member 5 are fitted on the projections 21 for positioning the movable reflector 2 to determine a position where the mount member 5 is to be fitted to the movable reflector 2. Next, the mount member 5 is fixed to the movable reflector 2 with a fixing screw 50. The positioning elements 21 and 514 are provided to keep horizontal in the lateral direction (direction of arrow a in FIG. 6) the mount member 5 to be fixed to the movable reflector 2.

In the Figures, the reference numeral 53 denotes a screw for maintaining the initial setting of the level. The screw 53 is used to pivot the level 36 (which will be described in detail later) around the support fulcrum of support members 522 and 602 for initially setting the level and maintaining the posture of the level 36 which is initially set against the resilience of the spring 520.

Figure 7:
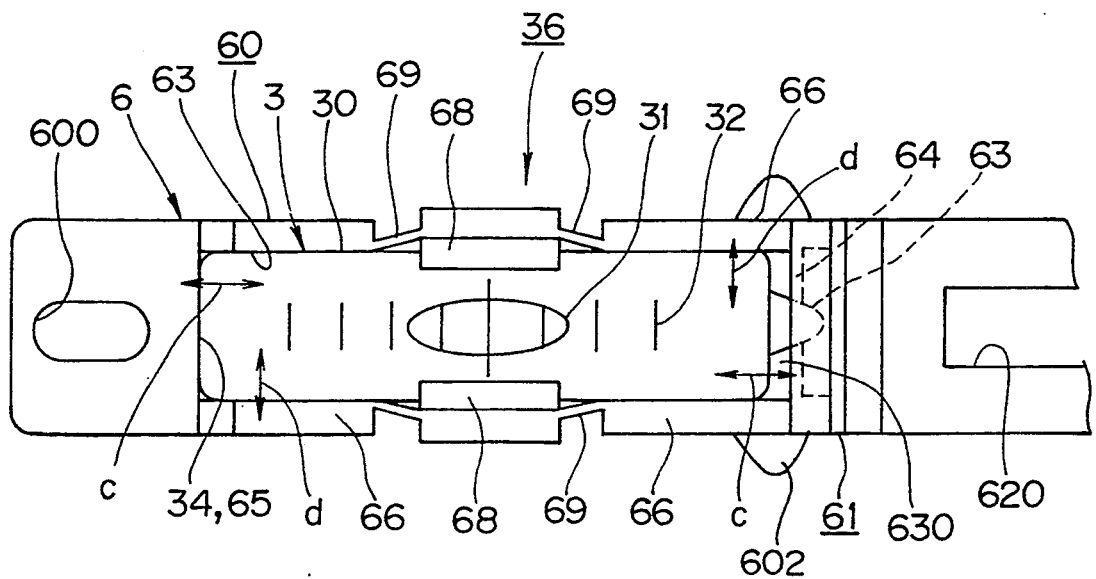

The level 36 consists of the casing 6 in which the bubble tube 3 is housed. As shown in FIGS. 5 through 7, the bubble tube 3 has a transparent tube 30 made of, for example, BC (semi-rigid glass) in which a bubble 31 is formed in a liquid such as alcohol anhydride or the like filled in the tube 30. Scale divisions 32 are marked on the upper surface of the transparent tube 30 of the bubble tube 3 perpendicularly to the axial (longitudinal) direction of the tube 30. The transparent tube 30 of the bubble tube 3 has formed integrally in the center of one end thereof a generally conical protrusion 33 through which the liquid has been filled into the tube 30, and also a flat reference surface 34 formed at the other end thereof. When viewed laterally, the transparent tube 30 of the bubble tube 3 is curved with the central portion thereof being somewhat high while both ends thereof are somewhat low.

Figure 13:
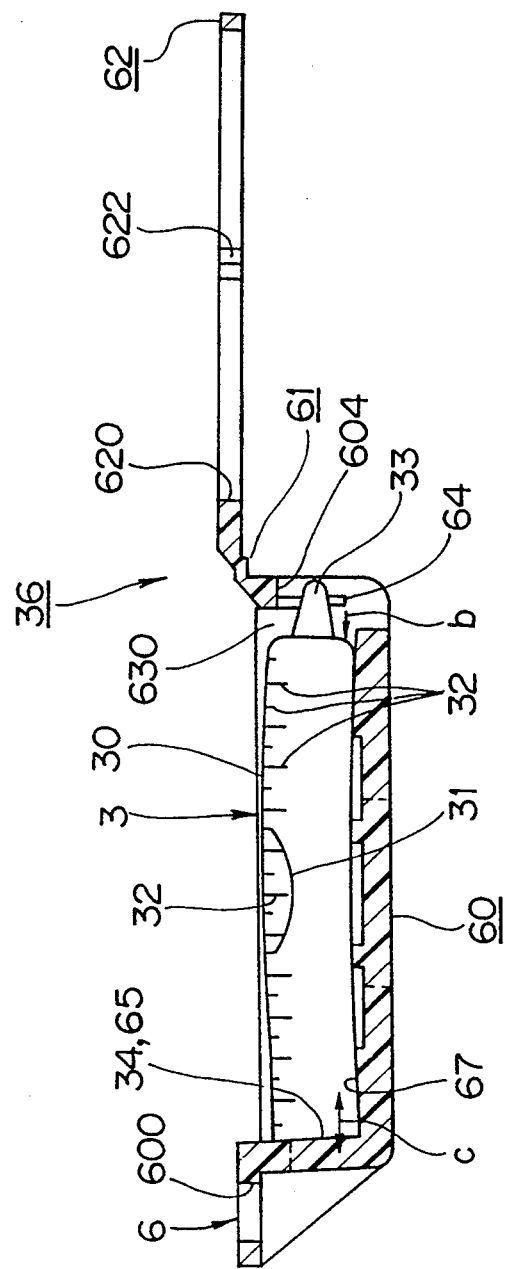
Figure 14:
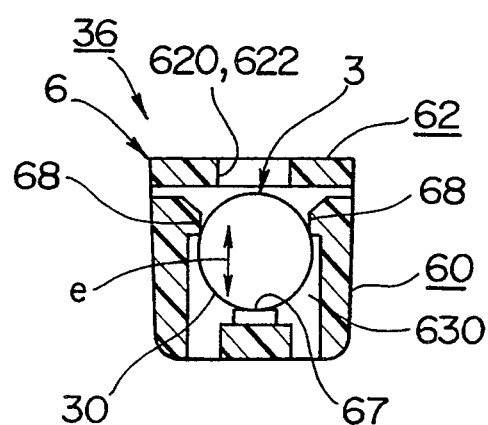
Figure 15:
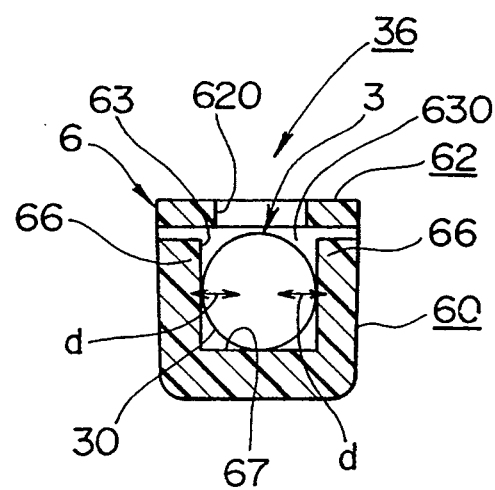
Figure 17:
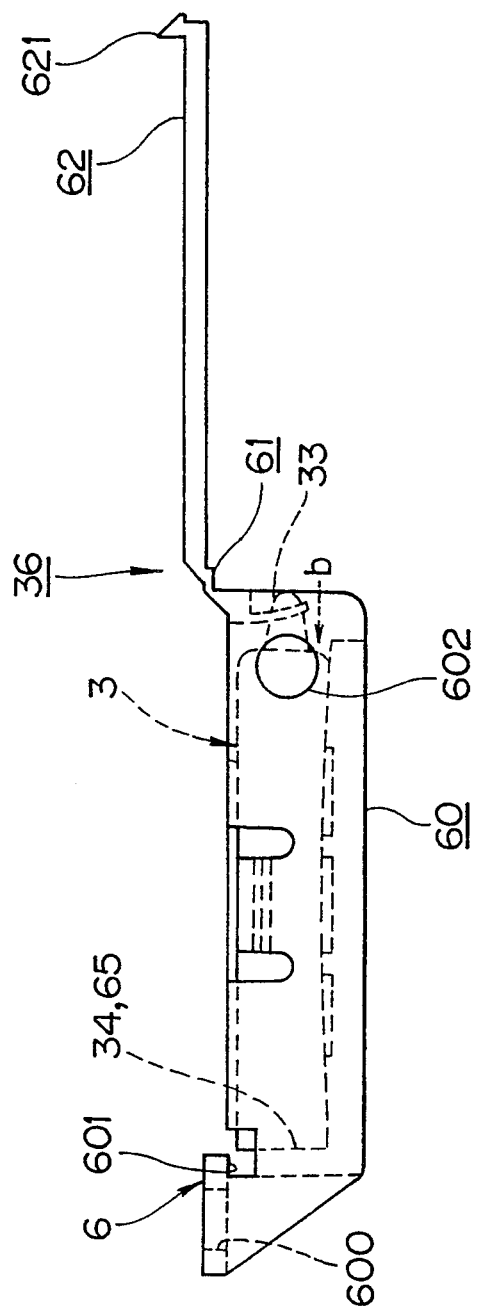
Figure 19:
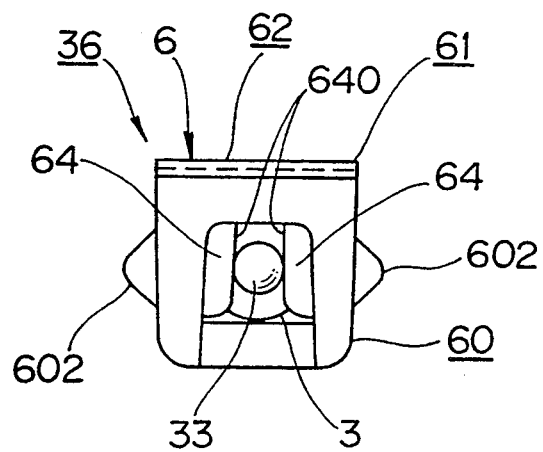

The casing 6 is made of a synthetic resin such as PP (polypropylene). As shown in FIGS. 7, 13 and 17, the casing 6 has a cover 62 provided at one end of a body 60 and the cover 62 has the one end thereof joined integrally to the casing body 60 by means of an integral coupling 61 and which can be opened and closed about the coupling 61.

The casing body 60 has a compartment 630 in which the bubble tube 3 is housed, and it is a hollow rectangle open at the top thereof. The top opening 63 is an entry for housing the bubble tube 3 into the compartment 630, and the bubble tube 3 in the compartment 630 can be viewed through the opening 63. The casing body 60 has formed at the other end thereof a through-hole 600 for the screw 53 and also has formed a pair of engagement recesses 601 in both the lateral side walls at the other end thereof. The casing body 60 has an opening 604 formed at one end thereof, and it also has formed integrally on opposite side faces at one end thereof a pair of generally conical engagement projections 602 which are fitted vertically pivotably in a pair of engagement concavities 522 in the mount member 5. Note that the engagement projections 602 may have any other convex form other than the conical or may be formed as pieces separate from the body 60. In the latter case, they may be attached to the mount plate by bonding or the like.

The cover 62 has the form of a rectangular plate. A through-hole 620 is formed nearly in the center of the whole cover 62, and the bubble tube is viewed through the hole 620. There is formed as lanced at both lateral sides of the other end of the cover 62 a pair of engagement pawls 621 which is to be engaged in the pair of engagement recesses 601. There is provided in the middle of the lateral opposite edges of the through-hole 620 in the cover 62 a pair of triangular protrusions 622 as the level reference. When the bubble in the bubble tube 3 is centered between these protrusions 622, it indicates leveling.

The aforementioned integral coupling 61 is of a thin hinge structure.

In the Figures, the reference numeral 64 denotes a rib-like or plate-like resilient retainer provided at one end of the body 60 of the casing 6. The resilient retainer 64 extends integrally from the upper edge of the opening 604 at one end of the casing 6, and has a resilience because its thickness is made smaller than that of the casing 6. A cut 640 is formed in the resilient retainer 64. It extends from the lower end of the retainer 64 to the base of the casing 6. The cut 640 has a width a little smaller than the outside diameter of the protrusion 33 of the bubble tube 3 where the resilient retainer 64 positions itself when it is received in the casing 6.

In the Figures, the reference numeral 65 denotes a flat reference surface formed on the other end face of the compartment 630 of the casing body 60.

The reference numeral 66 denotes opposite longitudinal side walls of the compartment 630 of the body 60. The inside spacing between these side walls 66 is nearly equal to the slightly smaller than the outside diameter of the transparent tube 30 of the bubble tube 3. These side walls 66 hold the bubble tube 3 as caught between them.

The reference numeral 67 denotes the bottom of the compartment 630 opposite to the opening 63 of the casing 60. The upper side of this bottom 67 is curved so as to be somewhat raised at the center thereof while being a little dented at both ends thereof, both correspondingly to the lower-side shape of the bubble tube 3.

The reference numeral 68 denotes projections formed integrally on the edges of the opening 63 of the casing body 60. They are provided in at least a pair and extend from the inner walls nearly at the middle of the opposite side walls 630. In this embodiment, they are lanced pawls. The pawls 68 serve to keep the bubble tube 3 in the compartment 630 from slipping out of the opening 63. More particularly, the pawls 68 force the bubble tube 3 to the bottom 67 thereof and thus cooperate with the bottom 67 to retain the bubble tube 3. The pawls 68 and bottom 67 retain the bubble tube 3 in a direction (direction of arrow e in FIG. 14) perpendicular to the direction of resilient retention by the resilient retainer 64 and reference surface 65 (direction of arrow c in FIG. 13) and the direction of retention by the opposite walls 66 (direction of arrow d in FIG. 15), respectively.

Figure 8:
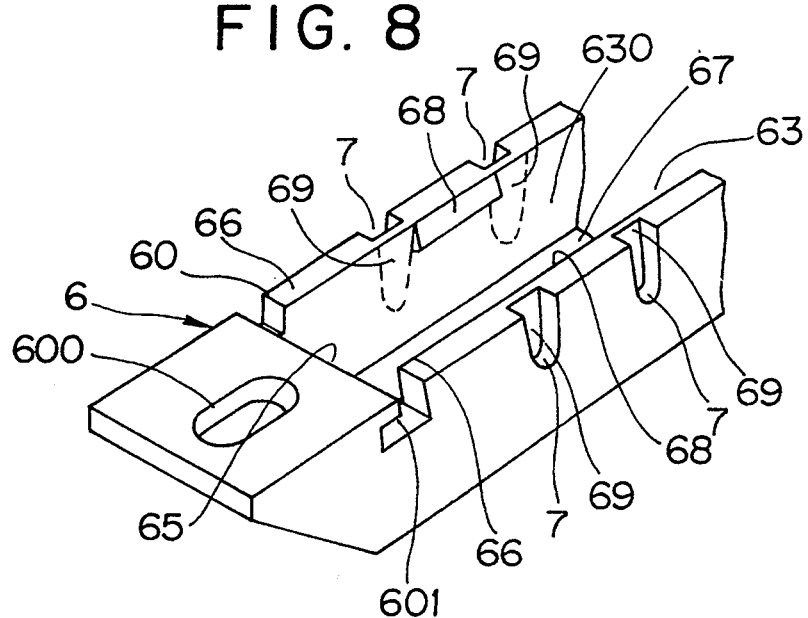
Figure 9:
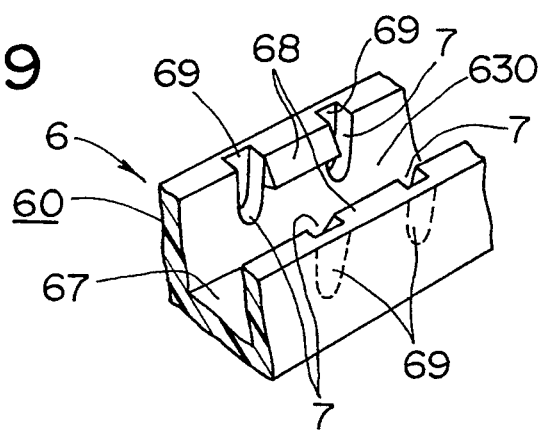
Figure 10:
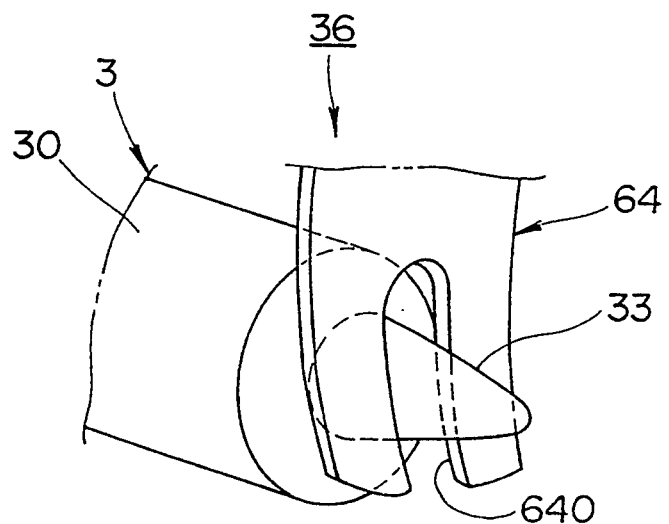
Figure 11:
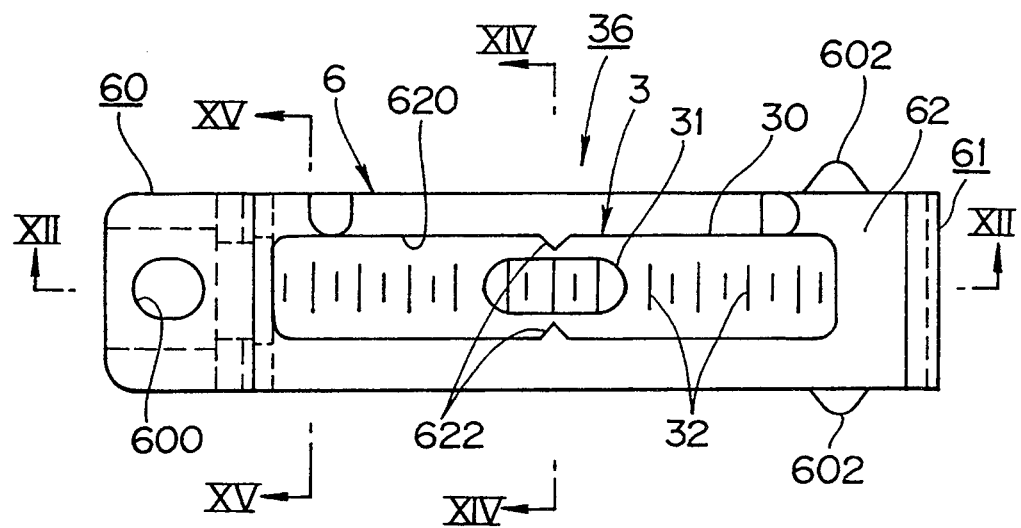

The reference numeral 7 denotes two pairs of cuts formed at both sides of the pair of pawls 68 as shown in FIGS. 8 and 9. The cuts 7 are formed in the opposite side walls 66 in an area ranging from the opening 63 nearly to the middle of the walls 66. The cuts 7 allow the pawls 68 to flexibly open and close when the bubble tube 3 is received in the casing 6 as will be described later.

Figure 20:
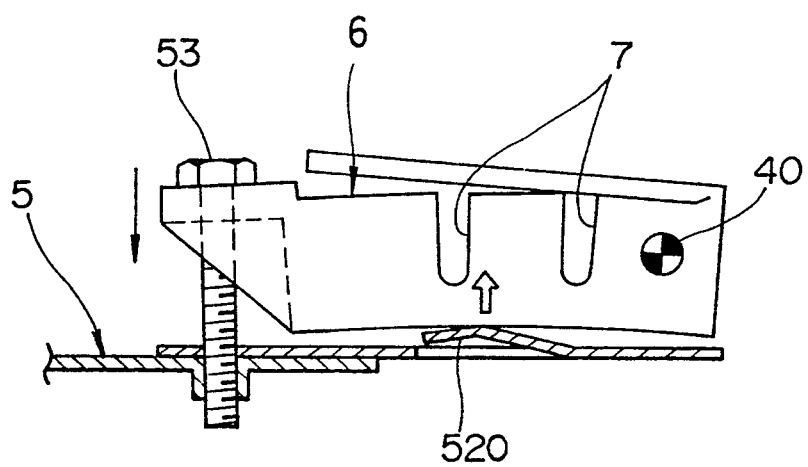

The reference numeral 69 denotes two pairs of couplings formed over the two pairs of cuts 7. These couplings 69 are provided to prevent the edge of the opening in the casing 6 from deflecting upward when the level 36 is initially set by pivoting as shown in FIG. 20 and allow the pawls 68 to flexibly open and close when the bubble tube 3 is received in the casing 6. These couplings 69 couple both sides of the pawls 68 separated from each other by the cuts 7 with both side walls 66. More specifically, the coupling 69 is thin and formed inside the cut 7 as shown in FIG. 8, outside the cut 7 as shown in FIG. 9 or in the middle of the thickness of the cut 7 (not shown).

Thus, the bubble tube 3 is pushed into the casing body 60 from the opening 63 in the casing 6, the bubble tube 3 is housed in the casing 6 with the bubble tube 3 being in contact at the lower face thereof with the upper face of the bottom 67 of the casing 6, and the protrusion 33 of the bubble tube 3 is inserted into the resilient retainer 64. Since the width of the cut 640 in the resilient retainer 64 is somewhat smaller than the outside diameter of the protrusion 33 of the bubble tube 3 where the resilient retainer 64 is positioned when the bubble tube 3 is received in the casing 6, the resilient retainer 64 bends toward the conical end of the protrusion 34 of the bubble tube 3 (in the opposite direction to the direction of arrow b in FIG. 12). Thus, the bubble tube 3 is forced in the direction of arrow b by the resilience of the resilient retainer 64, the reference surface 34 of the bubble tube 3 is forced to the reference surface 65 of the casing 6, thus the bubble tube 3 is caught between the reference surface 65 of the casing 6 and the resilient retainer 64 and resiliently retained in the axial direction thereof, namely, in the direction of arrow c. Also, the bubble tube 3 is retained as caught at both sides thereof between both the side walls 66 of the casing 6 in a direction perpendicular to the axial direction of the bubble tube 3, that is, in the direction of arrow d in FIG. 15. Further, the bubble tube 3 is retained as caught in a direction perpendicular to the directions of resilience c of the resilient retainer 64 and reference surface 65 and the holding direction d of both the side walls 66 of the casing 6, namely, in the direction of arrow e in FIG. 14. Thus, the bubble tube 3 is forced at the curved lower face thereof to the curved bottom face of the casing 6.

The bubble tube 3 is thus securely retained in the compartment 630 of the casing 6 so that the bubble tube 3 is blocked against axial displacement thereof, displacement thereof in a direction perpendicular to the axis thereof and rotation around the axis thereof.

More particularly, the two pairs of cuts 7 are formed at both the sides of the pair of pawls 68 according to the present invention. As shown in FIG. 7, when the bubble tube 3 is received in the casing 6, only the pair of pawls 68 flexibly opens a little outwardly, but both the side walls 66 do not open but securely hold the bubble tube 3 at both sides thereof so that the bubble tube 3 can be blocked against rotation about the axis thereof.

Figure 12:
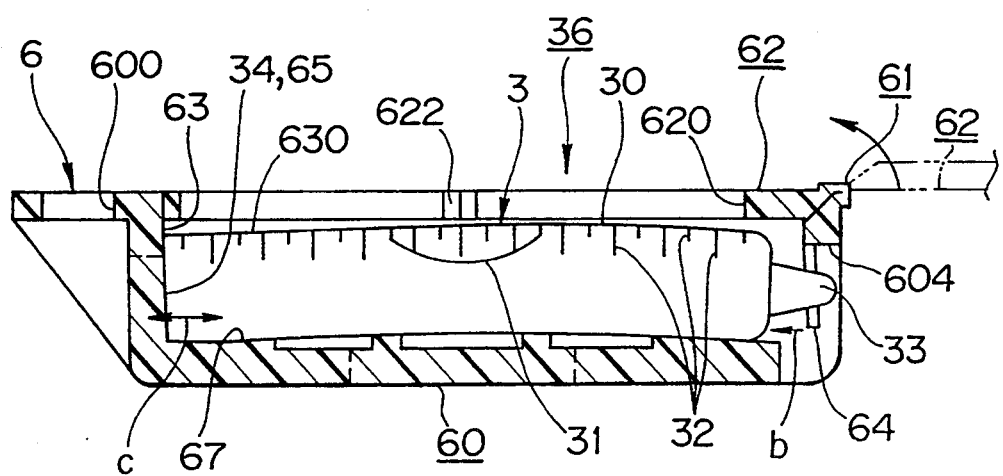
Figure 16:
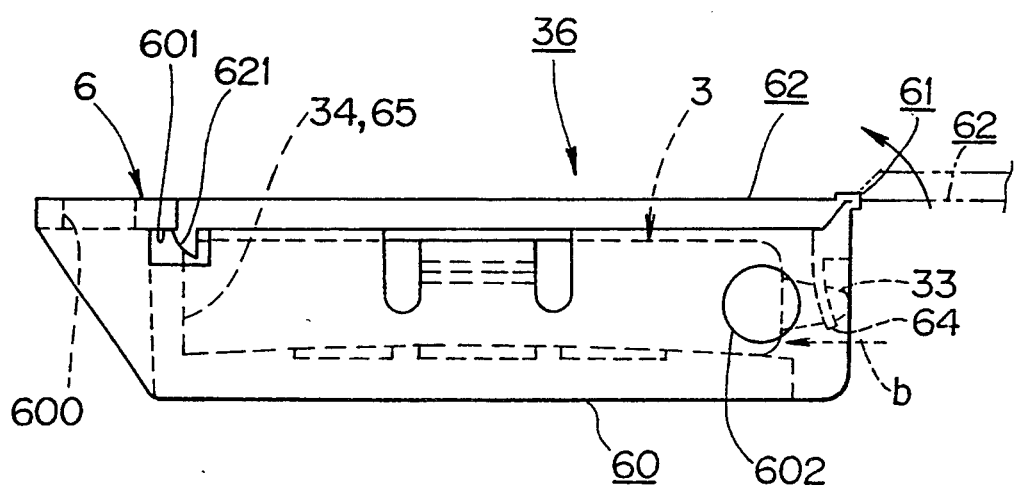
Figure 18:
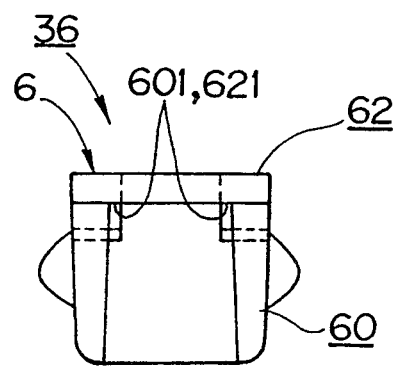

After the bubble tube 3 is received in the casing 6, the cover 62 is pivoted in the direction of arrow about the integral hinge-like coupling 61, the pair of engagement pawls 621 of the cover 62 is engaged in the pair of engagement recesses 601 in the casing body 60, and the cover 62 closes the opening 63 in the casing body 60, as shown in FIGS. 12 and 16. Since the throughhole 620 is formed in the cover 62, the bubble tube 3 is clearly seen through the hole 620. The level 36 has the structure previously described.

Thus the pair of projections 602 of the level 36 is engaged in the pair of engagement concavities 522 of the mount member 5 so that the level 36 is supported on the mount member 5 so as to be vertically pivotable about the support fulcrum of the support member consisting of the engagement concavities 522 and engagement projections 602. Next, the screw 53 is driven into the screw hole 512 in the mount member 5 through the through-hole 600 in the level 36. Thus, the level 36 is mounted to the mount member 5 in an initially settable manner, and the level 36 after initially set is retained against the resilience of the spring 520. The level 36 thus projects out of the bulb space 101 of the automotive headlamp A from the opening 10 of the lamp housing 1.

In the Figures, the reference numeral 8 denotes a heat insulation member. The heat insulation member 8 is made of a soft resilient material, and consists of an annular portion 80 which fits the circumferential edge of the opening 10 of the lamp housing 1 and a sheet portion 81 formed integrally with the annular 80 and which covers the opening 10, as shown in FIGS. 2 through 6. A plurality of slits 82 is radially formed on the sheet portion 81 to facilitate the insertion of the level 36 and mount member 5, and a plurality of round holes 83 is formed in the end portions of the plurality of slits 82 to prevent the sheet portion 81 from tearing from the ends of the slits 82.

The annular portion 80 of the heat insulation member 8 is fitted on the circumferential edge of the opening 10 of the lamp housing 1 as shown in FIG. 6, and the sheet portion 81 of the heat insulation member 80 closes the opening 10 of the housing 1. The heat insulation member 8 serves to shut the level 36 located outside the automotive headlamp A off the thermal convection of air inside the bulb space 10 1. Thus, the level 36 is not influenced by the heat so that the optical-axis adjustment can be confirmed with a correspondingly high accuracy.

The above-mentioned heat insulation member 8 is installed on the circumferential edge of the lamp housing 1, but it may be fixed on the circumferential edge of the open end of the transparent cap 11 which will be described below.

In the Figures, the reference numeral 11 denotes a transparent cap. This transparent cap 11 is made of PMMA (polymethyl methacrylate), and has the form of a hollow cylinder open at one end thereof. As shown in FIG. 3, three mount pieces 110 are formed integrally on the outer surface of the transparent cap 11 at the open end side thereof. Each of the mount pieces 110 is nearly triangular, and they are radially formed at a right angle with respect to the transparent cap 11. Also an outwardly projecting step is formed at the open end of the transparent cap 11. The transparent cap 11 covers the level 36 projecting out of the bulb space 10 1 of the automotive headlamp A, and closes the opening 10 of the lamp housing 1. Also an O-ring is interposed between the inner wall of the step at the open end of the transparent cap 11 and the outer wall of the step at the circumferential edge of the opening 10 of the lamp housing 1. The three mount pieces 110 of the transparent cap 11 are installed to the circumferential edge of the opening 10 of the lamp housing I with three fixing screws 111.

Since the transparent cap 11 covers the level 36 projecting out of the bulb space 101 of the automotive headlamp A as mentioned above, the level 36 can be protected against any external shock (such as any foreign matter or water coming from outside).

The optical-axis adjustment confirming device according to the present invention has the structure having been described in the foregoing. After the optical-axis of the automatic headlamp is adjusted by an expert engineer using a special equipment, the transparent cap 11 is removed and the level 36 is initially set by turning the screw 53 so that the bubble 31 in the bubble tube 3 coincides with the central reference line or the pair of central reference projections 622 of the casing 6. After completion of the initial setting of the level 36, the transparent cap 11 is installed to the lamp housing I with fixing screws 111. Thereafter, when the optical axis of the headlamp is suspected to have deviated from the correct direction due to a remodeling of or loading to the automobile, the automobile is made to stop on a horizontal floor or ground surface and the level 36 is viewed from outside the transparent cap 11 to check the position of the bubble 31 in the bubble tube 3. If the bubble 31 is found off the central reference line, the vertical optical-axis adjuster 104 is operated while viewing the movement of the bubble 31 from outside the transparent cap 11 kept fixed in place, to adjust the tilt of the movable reflector 2 so that the bubble 31 coincides with the central reference line. With this operation, the optical axis Z-Z restored to its initial position having been correctly adjusted.

In the optical-axis adjustment confirming device according to the present invention, the resilient retainer 64 of the casing 6 can be used to absorb the distortion caused due to the difference in thermal expansion ratio between the casing and bubble tube 3 so that it is possible to prevent cracking of the bubble tube or a liquid leak caused by the bubble tube 3 heavily hitting the casing 6 since the bubble tube 3 can be securely retained in the casing 6.

Furthermore, in the optical-axis adjustment confirming device according to the present invention, the two pairs of thin couplings 69 formed over the cuts 7 at both sides of the pair of pawls 68 of the casing 6 allow the pawls to move and prevent the casing 6 from being deformed. Thus, the bubble tube 3 can be retained in the casing 6 with greater rigidity.

In the above-mentioned embodiment, two pairs of thin couplings 60 are formed to prevent the casing 6 from being deformed. However, it is not always necessary to form such couplings 69, so that the cuts 7 may be formed through the side walls of the casing 6 as shown in FIG. 20.

Further, in the device according to the present invention, the casing body 60 in which the bubble tube 3 is housed and retained and the cover 62 in which the through-hole 620 through which the bubble tube is viewed and the pair of central reference projections 622 which are formed are coupled to each other by means of the hinge-like integral coupling 61 so that the cover 62 can be opened and closed. Therefore, the casing 6 can be formed with a reduced number of parts.

Moreover, in the device according to the present invention, the small-angular level reference projections 622 are formed on the throughhole 620 of the casing 6. These projections 622 permit an accurate confirmation of the optical-axis adjustment even in case the scale marked on the bubble tube 3 inside the casing is not easily viewable.

Figure 24:
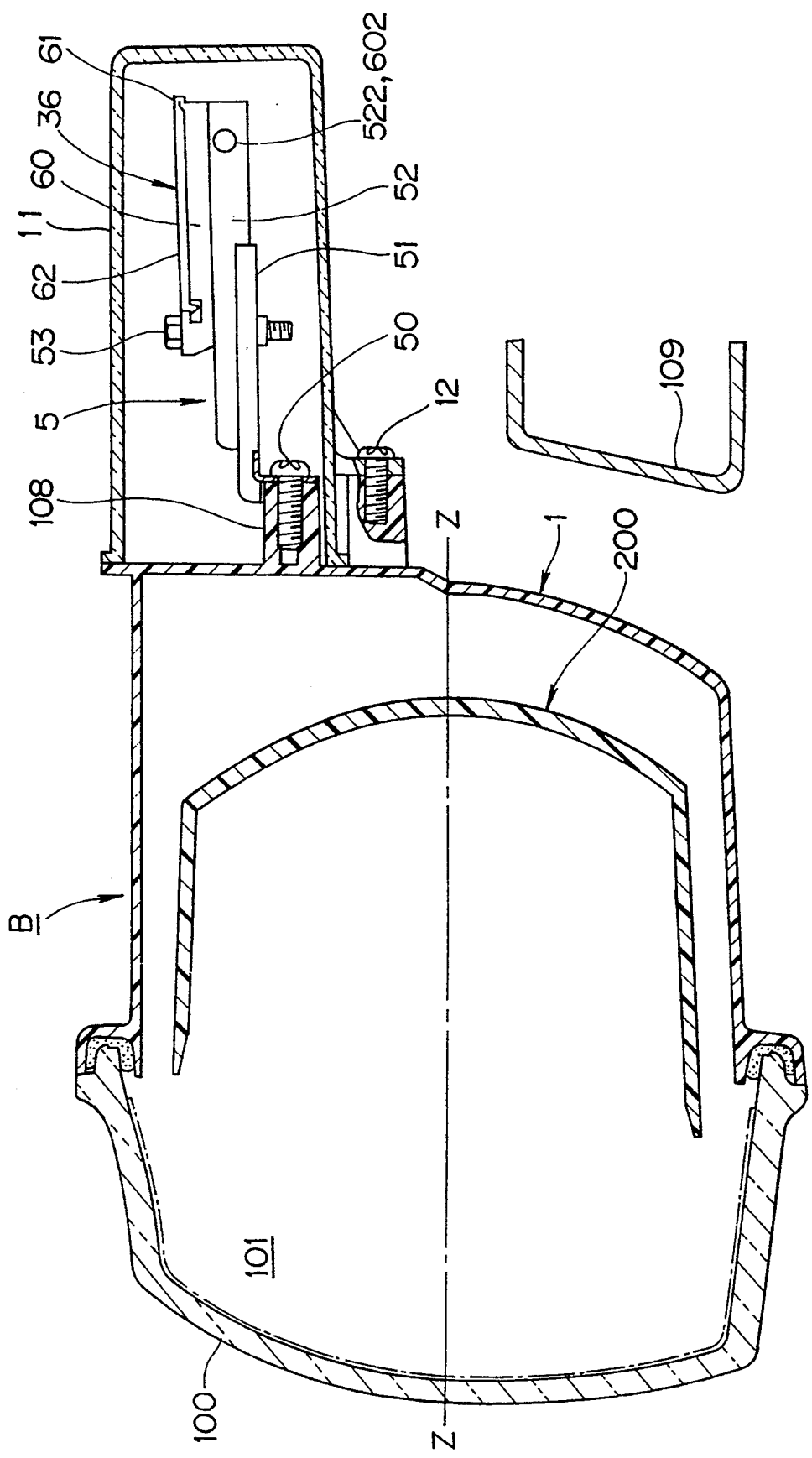
FIG. 24 is an axial sectional view of the automotive headlamp having a movable lamp nit and provided with an optical-axis adjustment confirming device according to the present invention.

FIG. 24 is a sectional view of the optical-axis adjustment confirming device according to the present invention is installed on an automotive headlamp B in which the lamp unit is movable.

In the automotive headlamp B in which the lamp unit is movable, the lamp unit (to be adjusted for optical-axis adjustment) comprising a lamp housing 1, a fixed reflector 200 and a lamp bulb (not shown) is pivotably installed to a car body 109 with a pivot bearing, etc. (not shown), and the optical-axis adjuster (not shown) is mounted on the lamp unit and car body 109. A mount member 5 is installed to a boss 108 of the lamp housing I of the headlamp B with a fixing screw 50. A level 36 is installed on the mount member 5 by using supports 522 and 602, a resilient member (not shown) and a screw 53. The level 36 is located outside the bulb space 101 and the level 36 is covered with a transparent cap 11.

This embodiment of the optical-axis adjustment confirming device can provide the same effect as the aforementioned embodiment.

Figure 25:
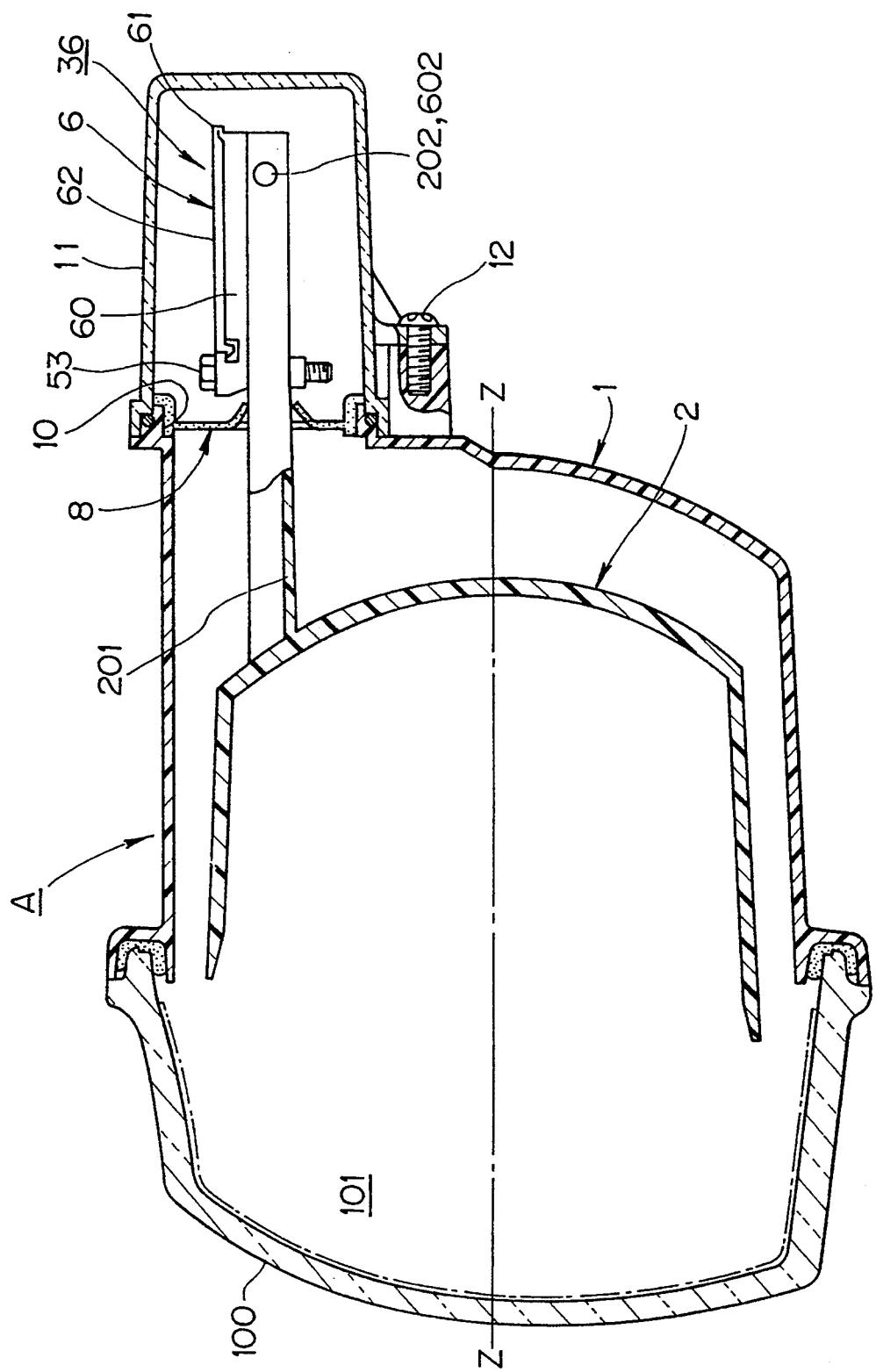
FIG. 25 is a sectional view of a variant of the optical-axis adjustment confirming device according to the present invention.

FIG. 25 is a sectional view of a variant of the optical-axis adjustment confirming device according to the present invention.

In this variant, the mount member 5 is not used. The device according to the present invention (comprising the level 36, etc.) is mounted directly on a to-be-adjusted movable reflector 2 (or lamp unit B) so that the level 36 can be initially set. Namely, a mount member 201 is integrally provided at the rear portion of the movable reflector 2, and the mount member 201 extends outwardly from an opening 10 in the lamp housing 1. The mount member 201 has a similar axial sectional shape to that of the second mount plate 52 of the previously described mount member 5. The level 36 is mounted on the horizontal bottom of the mount member 201 extending outwardly, and pivotably supported at both vertical sides of the mount member 201 by support members (a pair of engagement concavities 202 and a pair of engagement projections 602). A resilient member (not shown) is interposed between the horizontal bottom of the mount member 20 1 and the bottom of the level 36, and a screw 53 is driven into the mount member 201 through the casing 6 of the level 36.

In the above, the application of the device according to the present invention to an automotive headlamp of which the reflector is movable is explained with reference to FIG. 25. However, the device according to the present invention can be applied to an automotive headlamp of which the lamp unit is movable. In this case, the mount member is integrally provided at the rear of the headlamp as extended from the lamp housing 1. The level is fixed to the mount body by supports, resilient member, screws, etc. so that it is initially settable.

What is claimed is:

1. In an automotive headlamp having a mount body, a to-be-adjusted member mounted pivotably on said mount body, a lamp bulb fixed to said to-be-adjusted member and disposed inside a bulb space, and at least one optical-axis adjuster to vertically adjust the optical axis of said headlamp by pivoting said to-be-adjusted member vertically with respect to said mount body, a device for confirming the adjustment of said optical axis of said automotive headlamp, comprising:

a level consisting of a casing and bubble tube, fixed to said to-be-adjusted member, located outside said bulb space, the vertical adjustment of said optical axis of said to-be-adjusted member being confirmed by visually checking the movement of a bubble in said bubble tube; and a transparent cap covering said level;

wherein said mount body is a lamp housing and said to-be-adjusted member is a movable reflector;

wherein said level is mounted on said movable reflector and projects out of said bulb space from an opening formed in said lamp housing, and said transparent cap is mounted on a circumferential edge of said opening in said lamp housing and covers said level and opening; and wherein said transparent cap extends rearward of said lamp housing.

2. A device as set forth in claim 1, further comprising a heat insulation member which is provided in said opening to isolate said level from a thermal convection of air inside said lamp housing.

3. A device as set forth in claim 1, wherein said transparent cap is a hollow cylinder open at one end thereof.

4. A device as set forth in claim 1, further comprising an O-ring interposed between said circumferential edge of said opening in said transparent cap and said to-be-adjusted member.

5. A device as set forth in claim 1, wherein said transparent cap has mount pieces extending radially from an outer face thereof and which are used to fix said cap to said to be-adjusted member.

6. In an automotive headlamp having a mount body, a to-be-adjusted member mounted pivotably on said mount body, a lamp bulb fixed to said to-be-adjusted member, and at least one optical-axis adjuster to vertically adjust the optical axis of said headlamp by pivoting said to-be-adjusted member vertically with respect to said mount body, a device for confirming the adjustment of said optical axis of said automotive headlamp, comprising:

a mount body fixed to said to-be-adjusted member;

a level consisting of a casing and bubble tube, the vertical adjustment of said optical axis of said to-be-adjusted member being confirmed by visually checking the movement of a bubble in said bubble tube;

a support member pivotably supporting said level on said mount body;

a resilient member provided between said mount body and casing to always force said level in one direction about a supporting fulcrum of said support member; and an initial setting retainer to initially set said level by pivoting said level about said supporting fulcrum of said support member and to hold the posture of said level after initially being set against the resilience of said resilient member;

wherein said support member includes engagement projections formed on an outer surface of lateral sides of said casing and engagement concavities formed on vertical sides of a horizontal bottom of said mount body on which said level is mounted, said projections being engaged in said concavities.

7. A device as set forth in claim 6, wherein said mount body is a lamp housing and said to-be-adjusted member is a movable reflector.

8. A device as set forth in claim 6, wherein said resilient member is a leaf spring formed integrally on said horizontal bottom of said mount body on which said level is mounted.

9. A device as set forth in claim 6, wherein said engagement projections and said engagement concavities are substantially conical.

10. In an automotive headlamp having a mount body, a to-be-adjusted member mounted pivotably on said mount body, a lamp bulb fixed to said to-be-adjusted member, and at least one optical-axis adjuster to vertically adjust the optical axis of said headlamp by pivoting said to-be-adjusted member vertically with respect to said mount body, a device for confirming the adjustment of said optical axis of said automotive headlamp having a level consisting of a casing and bubble tube installed on said to-be-adjusted member, the vertical adjustment of said optical axis of said to-be-adjusted member being confirmed by visually checking the movement of a bubble in said bubble tube, wherein said bubble tube of said level is projected at one end thereof and is made flat at the other end thereof and said casing of the level comprises:

a compartment receiving said bubble tube therein;

a resilient retainer resiliently engaging said projecting end of said bubble tube housed in said compartment, said resilient retainer resiliently retaining said bubble tube axially thereof by forcing the flat end of said bubble tube against inner walls of said compartment and absorbing axial distortion of said bubble tube caused between said casing and bubble tube due to difference in thermal expansion ratio between said casing and bubble tube.

11. A device as set forth in claim 10, wherein said mount body is a lamp housing and said to-be-adjusted member is a movable reflector.

12. A device as set forth in claim 10, wherein said resilient retainer is a plate having cuts formed therein in which said bubble tube is inserted at one projecting end thereof.

13. In an automotive headlamp having a mount body, a to-be-adjusted member mounted pivotably on said mount body, a lamp bulb fixed to said to-be-adjusted member, and at least one optical-axis adjuster to vertically adjust an optical axis of said headlamp by pivoting said to-be-adjusted member vertically with respect to said mount body, a device for confirming the adjustment of said optical axis of said automotive headlamp having a level consisting of a casing and bubble tube installed on said to-be-adjusted member so that said level can be initially set by pivoting, the vertical adjustment of said optical axis of said to-be-adjusted member being confirmed by visually checking the movement of a bubble in said bubble tube, the casing of said level comprising:

a compartment receiving said bubble tube therein;

an opening communicating with said compartment;

projections formed on opposite edges of said opening to prevent said bubble tube in said compartment from slipping out of said opening;

cuts formed at both sides of said projections to permit said projections to flexibly open and close when said bubble tube is received into said compartment; and couplings formed over said cuts to prevent edges of said opening from deflecting upward when said level is initially set by pivoting.

14. A device as set forth in claim 13, wherein said couplings are thin and resilient.

15. A device as set forth in claim 13, wherein said projections are lanced pawls.

16. In an automotive headlamp having a mount body, a to-be-adjusted member mounted pivotably on said mount body, a lamp bulb fixed to said to-be-adjusted member, and at least one optical-axis adjuster to vertically adjust an optical axis of said headlamp by pivoting said to-be-adjusted member vertically with respect to said mount body, a device for confirming the adjustment of said optical axis of said automotive headlamp having a level consisting of a casing and bubble tube installed on said to-be-adjusted member, the vertical adjustment of said optical axis of said to-be-adjusted member being confirmed by visually checking the movement of a bubble in said bubble tube, the casing of said level comprising:

a body having a compartment receiving said bubble tube therein and an opening communicating with said compartment;

a cover which closes said opening;

an integral coupling which integrally couples a first end of said cover with a first end of said casing body; and an engagement portion which engages second end of said cover on a second end of said casing body;

wherein said integral coupling is a thin structure.

17. A device as set forth in claim 16, wherein said engagement portion comprises engagement recesses formed in laterally opposed side walls of said casing body at said second end thereof and engagement pawls formed as lances at lateral sides of said second end of said cover.

18. In an automotive headlamp having a mount body, a to-be-adjusted member mounted pivotably on said mount body, a lamp bulb fixed to said to-be-adjusted member, and at least one optical-axis adjuster to vertically adjust an optical axis of said headlamp by pivoting said to-be-adjusted member vertically with respect to said mount body, a device for confirming the adjustment of said optical axis of said automotive headlamp having a level consisting of a casing and bubble tube installed on said to-be-adjusted member, the vertical adjustment of said optical axis of said to-be-adjusted member being confirmed by visually checking the movement of a bubble in said bubble tube, the casing of said level comprising:

a compartment receiving said bubble tube therein;

an opening through which the bubble in said bubble tube in said compartment is viewed; and a level reference formed on edges of said opening to easily confirm the position of the bubble in said bubble tube;

wherein said opening is a through-hole and said level reference is a pair of triangular central reference projections formed on opposite edges of said opening.

19. In an automotive headlamp having a mount body, a to-be-adjusted member mounted pivotably on said mount body, a lamp bulb fixed to said to-be-adjusted member, and at least one optical-axis adjuster to vertically adjust an optical axis of said headlamp by pivoting the to-be-adjusted member vertically with respect to said mount body, a device for confirming the adjustment of said optical axis of said automotive headlamp, comprising:

a mount body fixed to said to-be-adjusted member;

a level consisting of a casing and bubble tube, the vertical adjustment of said optical axis of said to-be-adjusted member being confirmed by visually checking the movement of a bubble in said bubble tube;

a support member pivotably supporting said level on said mount body;

a resilient member provided between said mount body and said casing to always force said level in one direction about a supporting fulcrum of said support member; and an initial setting retainer to initially set said level by pivoting said level about said supporting fulcrum of said support member and to hold the posture of said level after initially being set against the resilience of said resilient member;

wherein said resilient member is a leaf spring formed integrally on a horizontal bottom of said mount body on which said level is mounted.

20. In an automotive headlamp having a mount body, a to-be-adjusted member mounted pivotably on said mount body, a lamp bulb fixed to said to-be-adjusted member, and at least one optical-axis adjuster to vertically adjust an optical axis of said headlamp by pivoting said to-be-adjusted member vertically with respect to said mount body, a device for confirming the adjustment of said optical axis of said automotive headlamp having a level consisting of a casing and bubble tube installed on said to-be-adjusted member, the vertical adjustment of said optical axis of said to-be-adjusted member being confirmed by visually checking the movement of a bubble in said bubble tube, the casing of said level comprising:

a body having a compartment receiving said bubble tube therein and an opening communicating with said compartment; a cover which closes said opening;

an integral coupling which integrally couples a first end of said cover with a first end of said casing body; and an engagement portion which engages a second end of said cover on a second end of said casing body;

wherein said engagement portion comprises engagement recesses formed at lateral side walls of said second end of said casing body and engagement pawls formed as lances at lateral sides of said second end of said cover.

\* \* \* \* \*